(12) United States Patent
Kondu (10) Patent No.: US 8,189,332 B2
(45) Date of Patent: May 29, 2012

(54) PORTABLE ELECTRONIC DEVICE

(75) Inventor: Yoshiaki Kondu, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 645 days.

(21) Appl. No.: 12/360,786

(22) Filed: Jan. 27, 2009

(65) Prior Publication Data
US 2010/0033912 A1 Feb. 11, 2010

(30) Foreign Application Priority Data

Jan. 30, 2008 (JP) ................. 2008-019987
Jan. 19, 2009 (JP) ................. 2009-008719

(51) Int. Cl.
*G06F 1/16* (2006.01)
*H04M 1/00* (2006.01)

(52) U.S. Cl. ........... 361/679.56; 361/679.26; 455/575.1; 455/575.3; 455/575.7

(58) Field of Classification Search .... 455/575.1–575.5, 455/575.7; 361/679.01–679.45, 679.55–679.59; 345/156, 157, 168, 169, 905
See application file for complete search history.

(56) References Cited

U.S. PATENT DOCUMENTS

| 7,058,176 | B2 * | 6/2006 | Chen et al. ............... 379/433.13 |
| 7,209,084 | B2 * | 4/2007 | Lindell .......................... 343/702 |
| 2004/0058721 | A1 * | 3/2004 | Kanazawa et al. ......... 455/575.3 |
| 2006/0111159 | A1 * | 5/2006 | Ide ............................. 455/575.1 |
| 2008/0300028 | A1 * | 12/2008 | Uejima et al. ............. 455/575.3 |

FOREIGN PATENT DOCUMENTS

| EP | 1770824 A1 * | 4/2007 |
| JP | 2006-067525 | 3/2006 |

* cited by examiner

*Primary Examiner* — Zachary M Pape
*Assistant Examiner* — Nidhi Desai
(74) *Attorney, Agent, or Firm* — Procopio, Cory, Hargreaves & Savitch LLP (57) ABSTRACT

A portable electronic device and technology operable to improve breakage resistance is disclosed. The portable electronic device and technology comprise a way for limiting rotation of a first housing and a second housing such that the housings are limited in further rotation in an open direction beyond a fully open position. A capacitive coupling may be used to provide a connection between electrical components in the first and second housings.

17 Claims, 9 Drawing Sheets

PORTABLE ELECTRONIC DEVICE

CROSS-REFERENCE TO RELATED APPLICATIONS

The present application claims priority under 35 U.S.C. §119 to Japanese Patent Application No. 2008-019987, filed on Jan. 30, 2008, entitled "PORTABLE ELECTRONIC DEVICE," the entirety of which is incorporated by reference herein. The present application also claims priority under 35 U.S.C. §119 to Japanese Patent Application No. 2009-008719, filed on Jan. 19, 2009, entitled "PORTABLE ELECTRONIC DEVICE," the entirety of which is incorporated by reference herein.

BACKGROUND OF THE INVENTION

1. Field of the Invention

Embodiments of the present disclosure relate generally to portable electronic devices, and more particularly relate to a portable electronic device comprising a first housing and a second housing that are connected to each other via a connecting section.

2. Description of the Related Art

Some types of portable electronic devices developed in recent years have a first housing, a second housing, and a section connecting the first housing and the second housing to each other. In such devices, the first housing and the second housing can be rotated relative to each other between an open position and a closed position.

When the first housing and the second housing are fully rotated relative to each other, a force is generated at the connecting section. If the force is high, one or more of the housings may break. Therefore, there is a need for portable electronic devices in which the housings cannot be easily broken due to the force generated by the rotation of the first housing and/or the second housing.

SUMMARY OF THE INVENTION

A portable electronic device and technology operable to improve breakage resistance is disclosed. The portable electronic device and technology comprise a way for limiting rotation of a first housing and a second housing such that the housings are limited in further rotation in an open direction beyond a fully open position. A capacitive coupling may be used to provide a connection between electrical components in the first and second housings.

One embodiment of the portable electronic device comprises a first housing, a second housing, and a connecting section configured to couple the first housing and the second housing to each other such that the first housing and the second housing are rotatable relative to each other between a closed position and a fully open position. The first housing comprises a first case member, a second case member, and a fitting portion at which the first case member is fitted to the second case member. The device further comprises a stopper in the fitting portion, configured to limit rotation of the first housing and the second housing such that the housings are not rotated beyond the fully open position in an open direction.

Another embodiment of the portable electronic device comprises a first housing, a second housing, and means for coupling the first housing and the second housing to each other such that the first housing and the second housing are rotatable relative to each other between a closed position and a fully open position. The device further comprises means for stopping rotation of the first housing and the second housing such that the housings are not rotated further from the fully open position in an open direction.

A further embodiment of the portable electronic device comprises a first housing comprising a first case member and a second case member. The first housing also comprises a fitting portion at which the first case member is fitted to the second case member. The portable electronic device also comprises a second housing, and a connecting section coupling the first housing and the second housing to each other such that the first housing and the second housing are rotatable relative to each other between a closed position and a fully open position. The device further comprises a stopper comprising a part of the fitting portion, and configured to absorb at least some of an applied force into the fitting portion, and thereby to limit rotation of the first housing and the second housing such that the first housing and the second housing are prevented from further rotation from the fully open position in an open direction.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the disclosure. The figures are provided to facilitate understanding of the disclosure without limiting the breadth, scope, scale, or applicability of the disclosure. The drawings are not necessarily made to scale.

DETAILED DESCRIPTION OF EXEMPLARY EMBODIMENTS

The following description is presented to enable a person of ordinary skill in the art to make and use the embodiments of the disclosure. The following detailed description is exemplary in nature and is not intended to limit the disclosure or the application and uses of the embodiments of the disclosure. Furthermore, there is no intention to be bound by any expressed or implied theory presented in the preceding technical field, background, brief summary or the following detailed description. The present disclosure should be accorded scope consistent with the claims, and not limited to the examples described and shown herein.

Embodiments of the invention are described herein in the context of one practical non-limiting application, namely, limiting the angle of tilt of hinges for a foldable mobile phone. Embodiments of the disclosure, however, are not limited to such foldable mobile phone applications, and the techniques described herein may also be utilized in other types of portable electronic devices or other foldable devices or structures. For example, embodiments may be applicable to foldable laptop computers, netbook computers, notebook computers, and other foldable devices. As would be apparent to one of ordinary skill in the art after reading this description, these are merely examples and the embodiments of the invention are not limited to operating in accordance with these examples. Other embodiments may be utilized and structural changes may be made without departing from the scope of the exemplary embodiments of the present disclosure.

The device described herein is one example embodiment of the disclosure. Embodiments of the present disclosure may be practiced with a variety of different portable electronic device configurations, systems, and electronic circuits. Those skilled in the art will appreciate that, for the sake of brevity, conventional techniques and components related to foldable mobile phones and other functional aspects of the portable electronic device and the individual operating components of the device may not be described in detail herein.

Hereinafter, an exemplary portable electronic device according to one embodiment of the present disclosure is described. The portable electronic device and technology comprise a stopper for limiting rotation of a first housing and a second housing such that the housings are limited in further rotation in an open direction (i.e., in a direction to further open the device) beyond an already fully open position. A capacitive coupling may be used to provide a connection to electrical components.

Figure 1A:
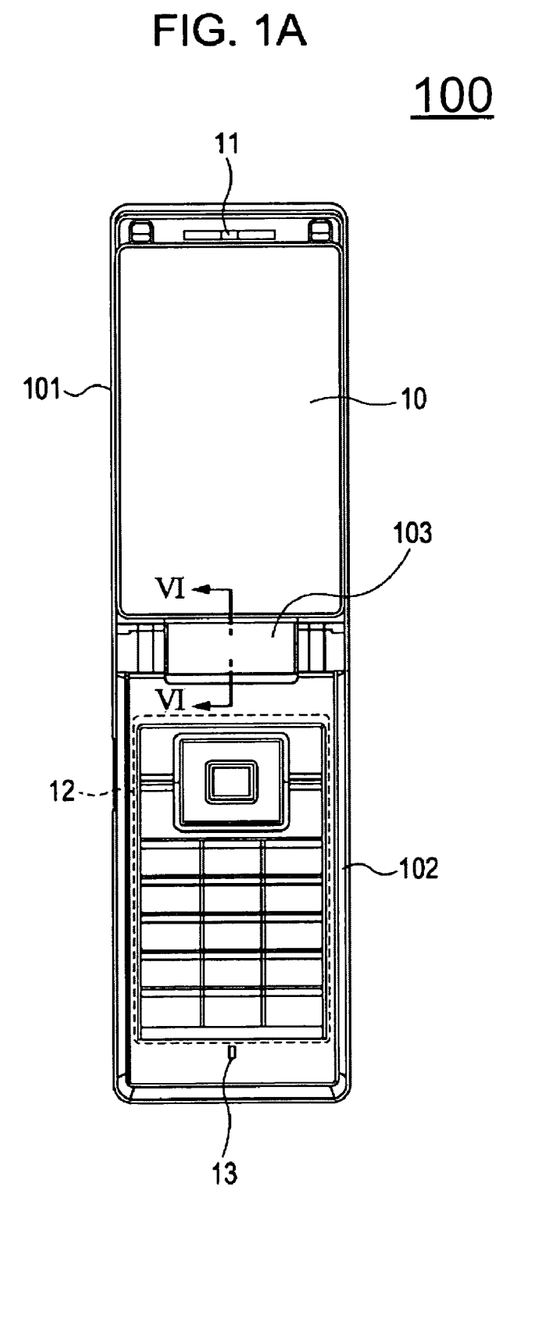
FIG. 1A is an illustration of an external view of a portable electronic device in an open position.
Figure 1B:
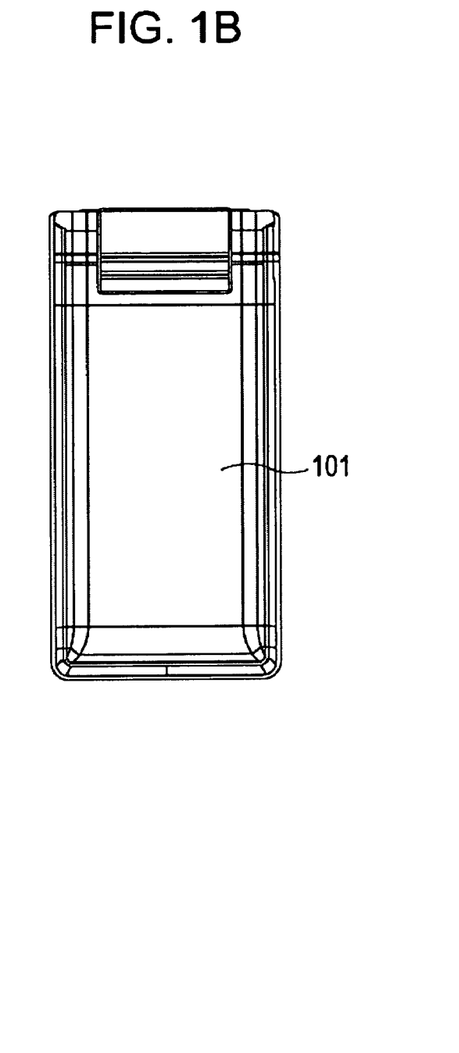
FIG. 1B is an illustration of an external view of the portable electronic device in a closed position.

FIGS. 1A and 1B are illustrations of external views of the portable electronic device 100 that may be used according to embodiments of the present disclosure. FIG. 1A is an illustration of an external view of a portable electronic device in an open position. FIG. 1B is an illustration of an external view of the portable electronic device in a closed position.

As shown in FIG. 1A, the portable electronic device 100 comprises a first housing 101, a second housing 102, and a hinge section 103. The first housing 101 may comprise a display device 10 and a receiver 11. The second housing 102 may comprise an operation section 12 and a microphone 13.

In one embodiment, the first housing 101 and the second housing 102 may be connected to each other by a hinge section 103 (connecting section). The hinge section 103 is configured to couple the first housing and the second housing to each other and may include a hinge mechanism. Utilizing the hinge section 103, the first housing 101 and the second housing 102 can be rotated relative to each other such that a position of the portable electronic device 100 is changed between an open (i.e., fully open) position shown in FIG. 1A and a closed position shown in FIG. 1B. A cross section line VI-VI (FIG. 1A) of the hinge section 103 is described below in the context of discussion of FIG. 6.

Figure 2:
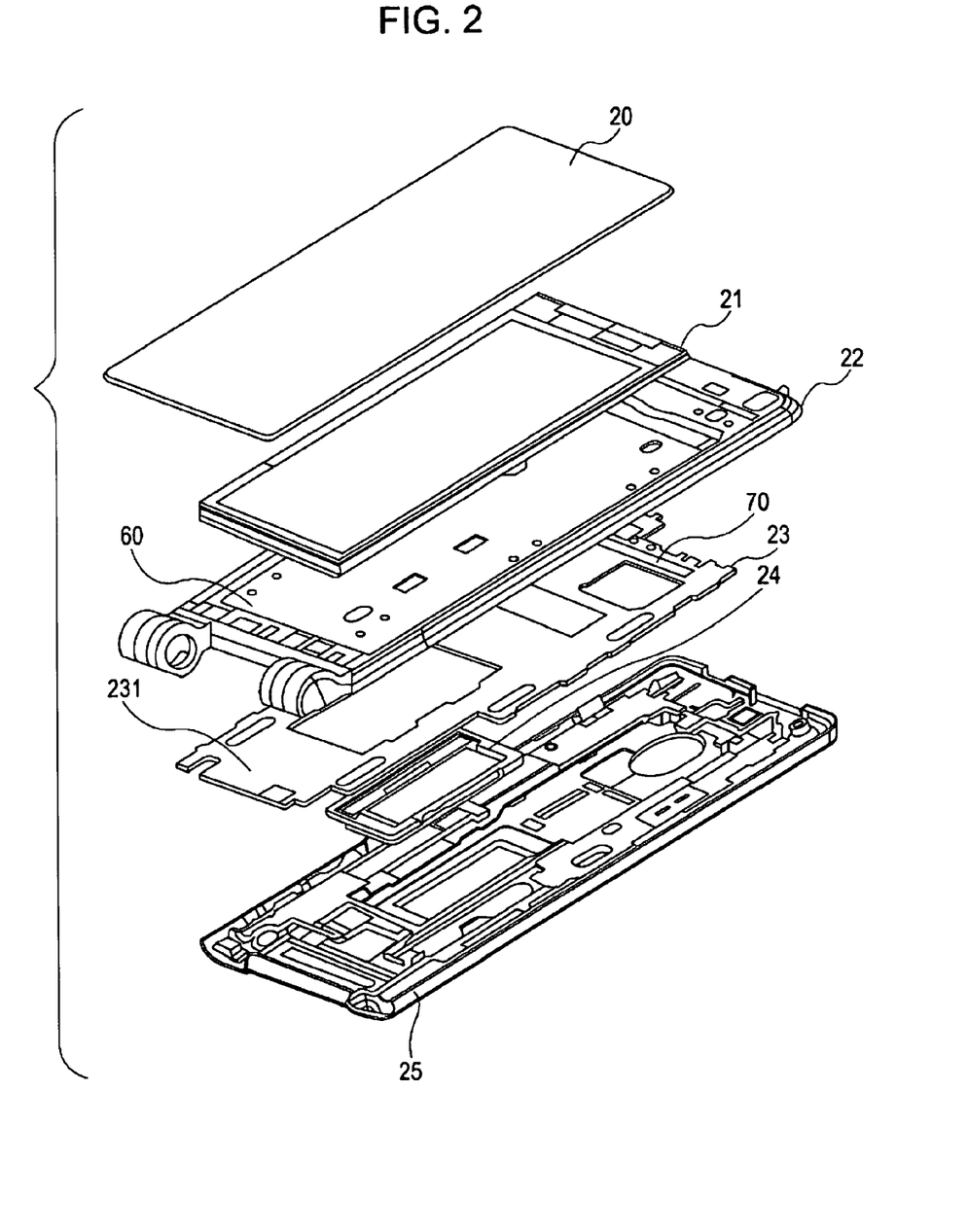
FIG. 2 is an exploded perspective view of a first housing of the portable electronic device showing an internal structure of the first housing according to an embodiment of the disclosure.

FIG. 2 is an exploded perspective view of the first housing 101 (see FIGS. 1A and 1B) of the portable electronic device 100 showing an internal structure of the first housing 101 according to an embodiment of the disclosure. As illustrated in FIG. 2, the first housing 101 comprises a Liquid Chrystal display (LCD) plate 20, an LCD module 21, a front case member 22, a circuit board 23, a sub-LCD module 24, and a rear case member 25.

The LCD plate 20 comprises a plate for a liquid crystal display (LCD). The LCD plate 20, may, without limitation, be made of hard glass or resin to protect the LCD module 21. In the embodiment shown in FIG. 2, the LCD plate 20 of the first housing 101 comprises the face on which the display device 10 (FIG. 1A) is mounted. The LCD plate 20 is enclosed when the portable electronic device 100 is folded (i.e., is in the closed position, FIG. 1B).

The LCD module 21 comprises a module portion of the LCD containing the liquid crystal, and is a main display device of the portable electronic device 100. The display device 10 comprises the LCD module 21, which may be visible when the portable electronic device 100 is in the open position.

The front case member 22 is fitted or coupled to the rear case member 25. The first housing 101 comprises the front case member 22 fitted or coupled to the rear case member 25. In one embodiment, the front case member 22 is integrally formed with a conductive member 60 and can be located adjacent to the circuit board 23. The electronic components mounted on the circuit board 23 are covered with the conductive member 60 in the first housing 101. Therefore, the electronic components mounted on the circuit board 23 of the housing 101 are physically protected by the conductive member 60. In one embodiment, the conductive member 60 may also provide structural support to the first housing. The conductive member 60 may be, without limitation, made of metal.

The circuit board 23 may be configured to mount electronic components thereon. These electronic components perform various functions in the first housing 101. For example, a control circuit for driving the LCD module 21 and the sub-LCD module 24 to display an image may be implemented on the circuit board 23. The circuit board 23 may include a reference potential portion 231, and an antenna 70.

The reference potential portion 231 may be electrically connected to a reference potential point. The reference potential portion 231 may be in contact with the conductive member 60 at least at one point. Therefore, the conductive member 60 is electrically connected to the reference potential portion 231 so as to be at a reference potential. This structure can serve to reduce the electromagnetic noise generated by the electronic components on the circuit board 23, and reduce their affect on other components. Moreover, the structure serves to protect the electronic components on the circuit board 23 from electromagnetic noise coming from outside the first housing 101 as well.

Since the conductive member 60 is in physical and electrical contact with the reference potential portion 231 of the circuit board 23, the potential of the conductive member 60 is equal to the reference potential of reference potential portion 231. Thus, the conductive member 60 electromagnetically protects the electronic components on the circuit board 23 covered by the conductive member 60, reduces electromagnetic noise from electronic components and prevents incoming noise that may affect the electronic components.

In the above-described embodiment, the front case member 22 and the conductive member 60 are integrally formed, and the conductive member 60 physically and electromagnetically protects the electronic components on the circuit board 23. However, the present disclosure is not limited to such a structure, and a shield member that is different from the conductive member 60 may be provided so as to protect the electronic components on the circuit board 23. In this case, it is preferable that the shield member be made of conductive metal and electrically connected to the reference potential portion 231.

The conductive member 60 and/or the shield member may be, without limitation, shaped as a sheet, block, tube, mesh, plane, or other shape. The shape may be chosen to provide the necessary structural or electrical properties to physically and electromagnetically protect the electronic components on the circuit board 23.

In the above-described embodiment, the conductive member 60 is electrically connected with the reference potential portion 231 of the circuit board 23. However, the present disclosure is not limited to such a structure, and the conductive member 60 may be electrically connected with another reference potential point.

The antenna 70 is configured to receive electromagnetic signals through a communication channel. The antenna 70 may be located, without limitation, in at least one of the group consisting of the first housing 101 and the second housing 102. In the embodiment shown in FIG. 2, the antenna 70 is located in the first housing 101.

The sub-LCD module 24 comprises a small liquid crystal display that may include a sub-display (not shown), which may be viewable from the exterior of the portable device 100 through the rear case member 25. In one embodiment, the sub-display may be exposed to the outside (the side exposed to outside media such as external light) even when the portable electronic device 100 is in the closed position. In another embodiment, the sub-LCD module 24 may be omitted.

As explained above in reference to front case member 22, the rear case member 25 may be coupled to the front case member 22 so as to comprise a structure of the first housing 101. The rear case member 25 comprises the outside of the portable electronic device 100 when the portable electronic device 100 is in the closed position (FIG. 1B). Thus, the exterior of the first housing 101 comprises three parts, namely, the front case member 22, the rear case member 25, and a hinge cover 33 (shown below in FIG. 3). By changing the color or the material of the hinge cover 33 to be different from those of the rear case member 25, the rear case member 25 can be made to look smaller and can be flexibly designed.

Figure 3:
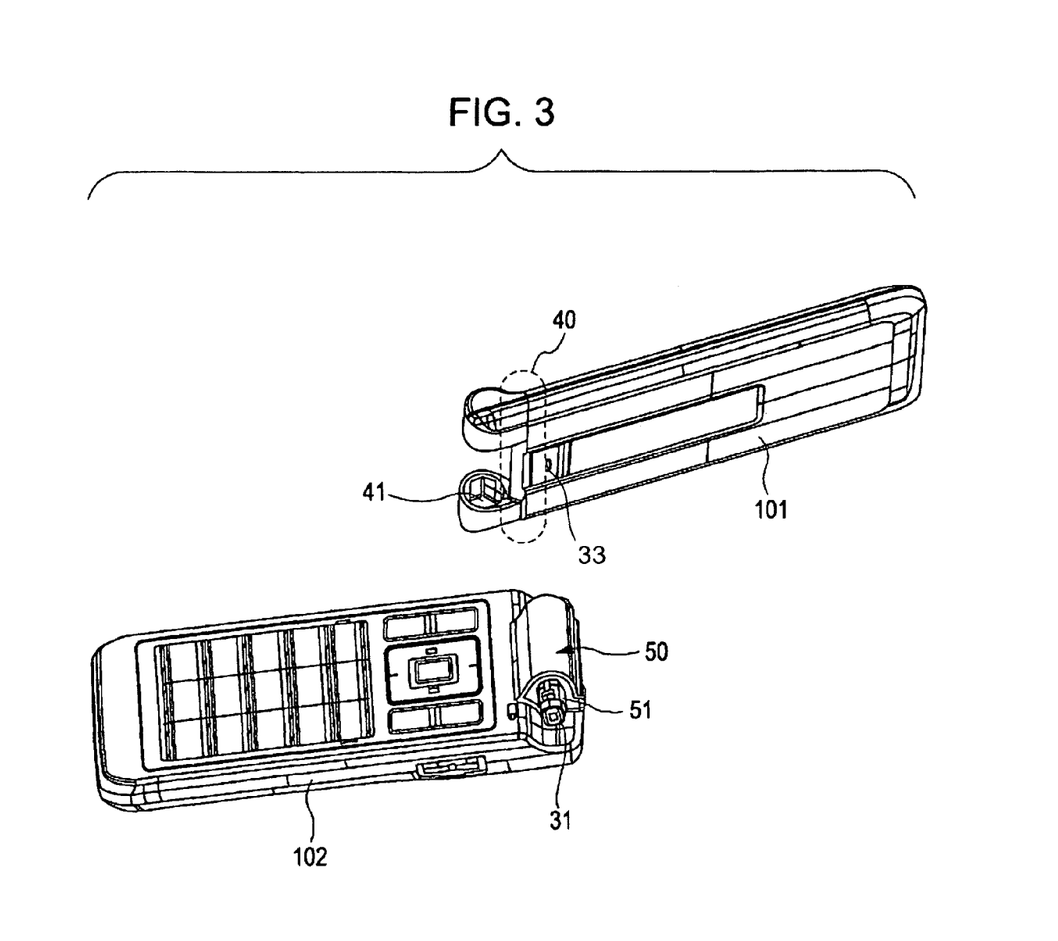
FIG. 3 is an illustration of a view of the first housing and a second housing being separated from each other to illustrate how the first housing and the second housing can be connected to each other by a hinge section.

FIG. 3 is an illustration of a view of the first housing 101 (also in FIG. 1B) and the second housing 102 (also in FIG. 1A) being separated from each other to show how the first housing 101 and the second housing 102 may be connected to each other by the hinge section 103 (FIG. 1A).

As shown in FIG. 3, one part of hinge section 103 (FIG. 1) is coupled to the first housing 101 and comprises a fitting portion 40 and an opening 41. Also, another part of hinge section 103 is coupled to the second housing 102 and comprises a hinge assembly 31, a protrusion 50, and an opening 51 of the protrusion 50.

The hinge assembly 31 may be coupled to the opening 41 of the first housing 101 and the opening 51 of the protrusion 50 so as to join the first housing 101 and the second housing 102 to each other at the hinge section 103. In one embodiment, the hinge assembly 31 may be coupled to the rear case member 25 (FIG. 2) such that the hinge cover 33 (third case member, also see FIG. 6) can cover the hinge assembly 31. The fitting portion 40 and the protrusion 50 are structured such that the first housing 101 and the second housing 102 are rotation-limited. In this manner the housings 101 and 102 are limited from rotating more than a predetermined angle in the open direction (as shown below in FIG. 4). The predetermined angle may be measured between the display device 10 of first housing 101 and the operation section 12 of second housing 102, and may be, without limitation, about 170 degrees. In one embodiment, the hinge cover 33 may be coupled to a region surrounding the fitting portion 40 of the rear case member 25. In an alternate embodiment, the hinge cover 33 may be coupled directly to the fitting portion 40 (i.e., to the front case member 22).

Figure 4:
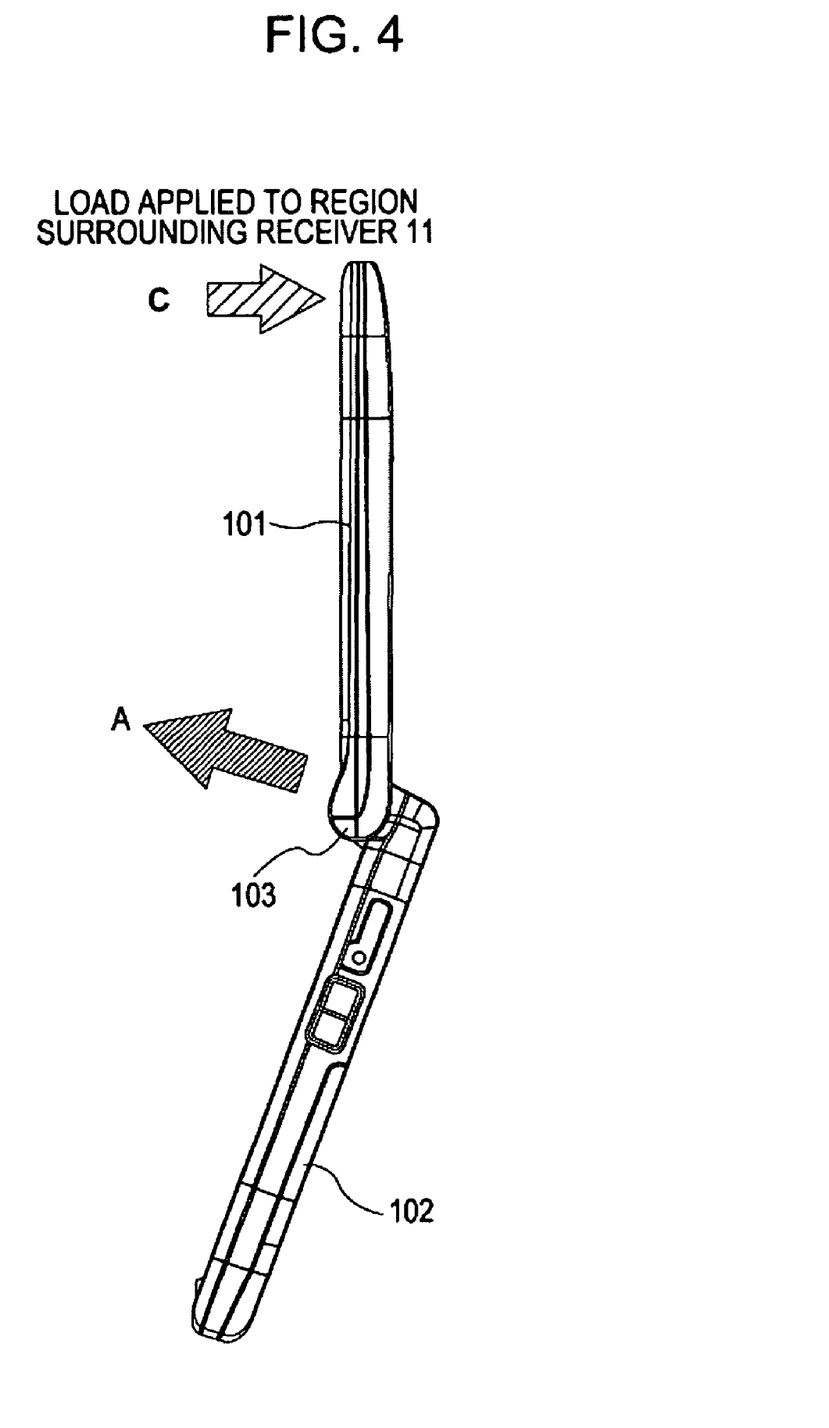
FIG. 4 is an illustration of the portable electronic device in an already fully opened position showing a force that may be applied, to the region surrounding the hinge section, in a direction to further open the device.

FIG. 4 is an illustration of a first force A applied to a region surrounding the hinge section 103 in response to a second force C applied to the portable electronic device 100 in a direction to open the device in a position beyond a fully opened position. In the example shown in FIG. 4, the force C is applied to a region surrounding the receiver 11 (FIG. 1A) of the first housing 101. The force C is applied in a direction that can cause at least one of the first housing 101 and the second housing 102 to rotate toward an open position beyond the fully open position. The force C may be applied to the region surrounding the receiver 11, for example, when a user holds the portable electronic device 100 in the open position to his/her ear to make a call.

For another example, when the force C is applied to the region surrounding the receiver 11 of the first housing 101, while the first housing 101 and the second housing 102 are in a fully open position, a reactive force in the direction of arrow A in FIG. 4 may be applied to the hinge section 103 of the first housing 101. In this manner, the force A can affect at least the rear case member 25 (FIG. 2) and the hinge cover 33 (FIG. 3).

For another example, when a user tries to open the first housing 101 and the second housing 102 more than the predetermined angle, a force may be applied to the region surrounding the hinge section 103. Consequently the hinge section 103, some portions of the first housing 101 adjacent to the hinge section 103, or some portions of the second housing 102 adjacent to the hinge section 103 may be damaged. Also, the hinge cover 33 (FIG. 3) may be detached from the first housing 101.

To prevent breakage of the housings 101/102, detachment of the hinge cover 33 (FIG. 3), and/or other damages due to the excessive force applied at least to the region surrounding the receiver 11, embodiments of the disclosure, teach a hinge rotation limiter. The hinge rotation limiter limits the rotation of the first housing 101 and the second housing 102 such that the housings 101/102 are stopped from further rotation in an open direction beyond an already fully open position. The hinge rotation limiter will hereinafter be referred to as a stopper. A stopper (as explained below in more detail) may be included in the fitting portion 40 (FIG. 3) of the first housing 101 so as to eliminate or substantially reduce the excess force in the direction of arrow A (FIG. 4).

Figure 5:
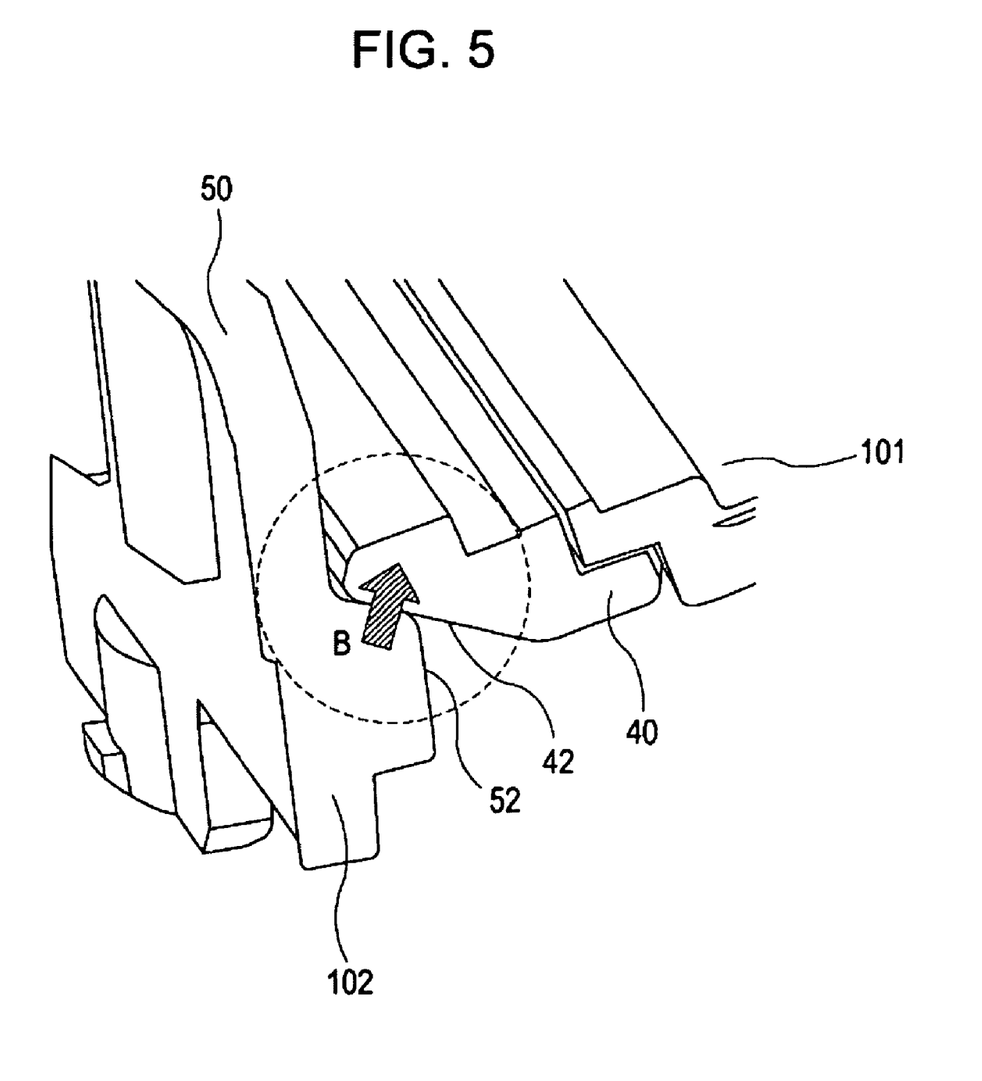
FIG. 5 is an illustration of an enlarged sectional view of an area in which a fitting portion and a protrusion are connected to each other when the first housing and the second housing are in a fully open position, according to an embodiment of the disclosure.

FIG. 5 is an illustration of an enlarged sectional view of an area in which the fitting portion 40 and the protrusion 50 are connected to each other when the first housing 101 and the second housing 102 are in the fully open position. As shown in FIG. 5, a fitting portion stopper 42 (a hinge rotation limiter) may be positioned in the fitting portion 40 to limit the rotation of the first housing 101 and the second housing 102 at the hinge section 103. The fitting portion stopper 42 is configured to contact the protrusion 50 of the second housing 102 at a protrusion stopper 52 when the first housing 101 and the second housing 102 are in the fully open position. The fitting portion stopper 42 may be, without limitation, an integral part of the rear case member 25, or a part separate from the rear case member 25. The fitting portion stopper 42 may have, without limitation, a substantially triangular shape in cross section.

The above-described embodiment includes the protrusion stopper 52 that contacts the fitting portion stopper 42 of the first housing 101 when the portable electronic device 100 is in the fully open position. In another embodiment, the protrusion stopper 52 may be omitted. In this case, it is preferable that the fitting portion stopper 42 directly contact the protrusion 50 of the second housing 102.

When the force C is applied to further open the first housing 101 and the second housing 102 from the fully open position (FIG. 4), a reaction force in the direction of arrow B can result. The direction of arrow B in FIG. 5 may be the same as the direction of arrow A in FIG. 4. According to this embodiment of the disclosure, the fitting portion stopper 42 may receive some or all of the reaction force in the direction of arrow B as a result of contacting the protrusion stopper 52.

In this manner, the fitting portion stopper 42 prevents components of housings 101/102 of the portable electronic device 100 from being broken or detached. The fitting portion stopper 42 can protect the components by, for example, absorbing or diverting the pressure due to the reaction force A/B. Some of the components of the first housing 101 (see FIG. 2) that may be protected from damage, without limitation, may include the front case member 22, the rear case member 25, the hinge assembly 31, the hinge cover 33, and the case member of the second housing 102.

The hinge cover 33 may be configured to cover the hinge section 103 and may be coupled to the rear case member 25 at the fitting portion 40. This structure is advantageous in terms of appearance in that, for example, the first housing 101 can be made to look small. Moreover, since the above-described fitting portion stopper 42 increases the strength of the region surrounding the hinge cover 33, the structures of the housings 101/102 are simplified and the number of components is reduced.

In an embodiment, the fitting portion stopper 42 is made strong enough to receive the reaction force A/B. Hereinafter, one exemplary structure for providing strength to the fitting portion stopper 42 is described.

Figure 6:
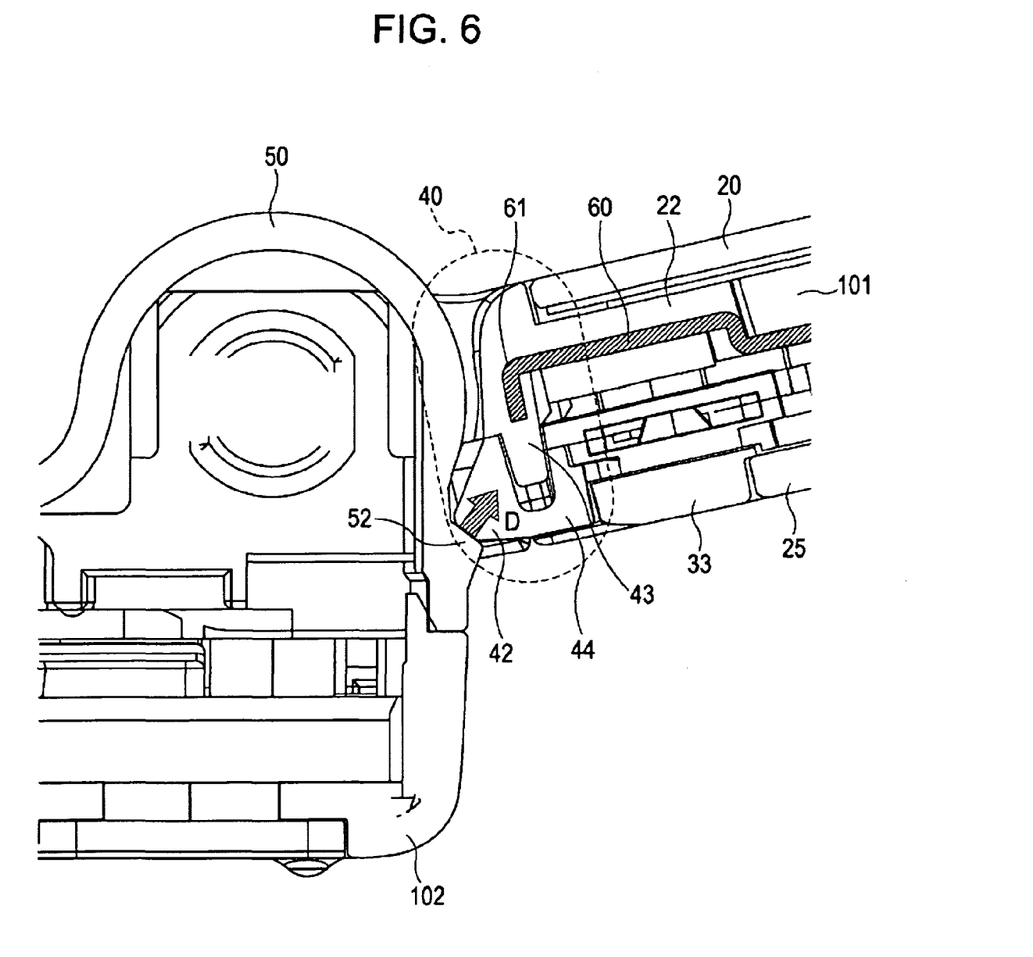
FIG. 6 is an illustration of a sectional view taken along line VI-VI of FIG. 1 according to an embodiment of the disclosure.

FIG. 6 is a longitudinal sectional view (VI-VI in FIG. 1) of the portable electronic device 100 taken along a section line across the hinge section 103. The embodiment described in FIG. 6 may include: the LCD plate 20, the LCD module 21, the front case member 22, the rear case member 25, the hinge cover 33, the fitting portion 40, the fitting portion stopper 42, the protrusion 43, the recess 44, the protrusion 50, the protrusion stopper 52, the conductive member 60, the bent portion 61, the first housing 101, the second housing 102, and the hinge section 103 (not shown). Components of the portable electronic device 100 shown in FIG. 6 may share the same parameters, definition and functionality as FIGS. 1-5. Therefore, these definitions and the functionalities are not redundantly explained herein.

As shown in FIG. 6, the fitting portion stopper 42, which is in contact with the protrusion stopper 52 of the second housing 102, receives a reactive force in the direction of arrow D. The direction of arrow D in FIG. 6 may be the same as the direction of arrow A in FIG. 4 and the direction of arrow B in FIG. 5.

In one embodiment, the fitting portion 40 comprises the protrusion 43 and the recess 44. The protrusion 43 is a rib shaped (convex) protrusion formed in the fitting portion 40 of the front case member 22. The recess 44 comprises a rib-receiving (concave) structure formed in the fitting portion 40 of the rear case member 25. Fitting the protrusion 43 into the recess 44 forms the fitting portion 40 where the front case member 22 is fitted to the rear case member 25. In another embodiment, a rib-receiving recess may be formed in the front case member 22, and a rib protrusion may be formed on the rear case member 25.

The protrusion 43 of the front case member 22 is fitted into the recess 44 of the rear case member 25 to form the fitting portion 40 in which the fitting portion stopper 42 is located. The front case member 22 is integrally formed with the conductive member 60. The conductive member 60 is located in the protrusion 43, and is bent in a depth direction of the first housing 101 so as to form the bent portion 61. The bent portion 61 increases the physical strength of the protrusion 43 and the physical strength of the fitting portion 40, thereby enabling the fitting portion stopper 42 to absorb at least some or all of the applied force.

Figure 7A:
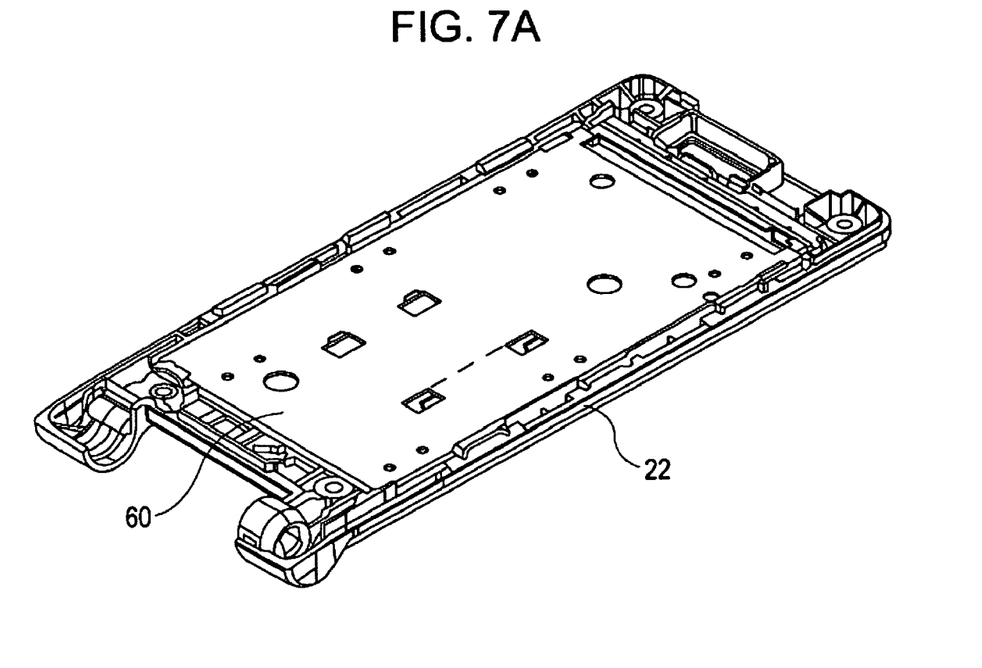
FIG. 7A is an illustration of a view showing a front case with a conductive member attached thereto according to an embodiment of the disclosure.
Figure 7B:
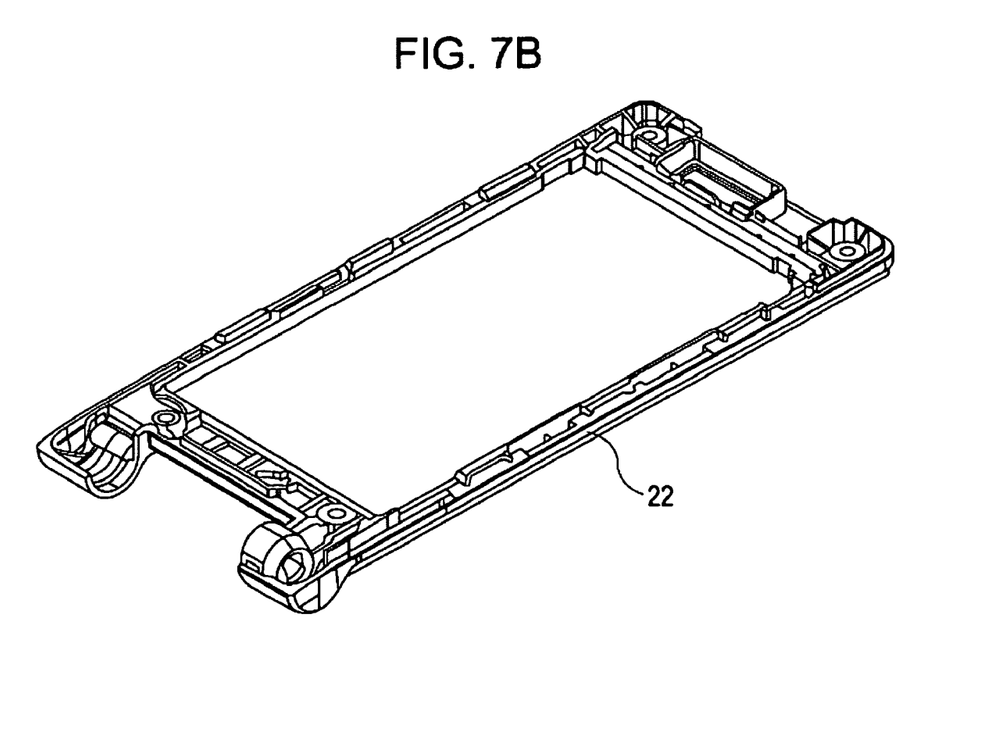
FIG. 7B is an illustration of a view showing the front case according to an embodiment of the disclosure.
Figure 7C:
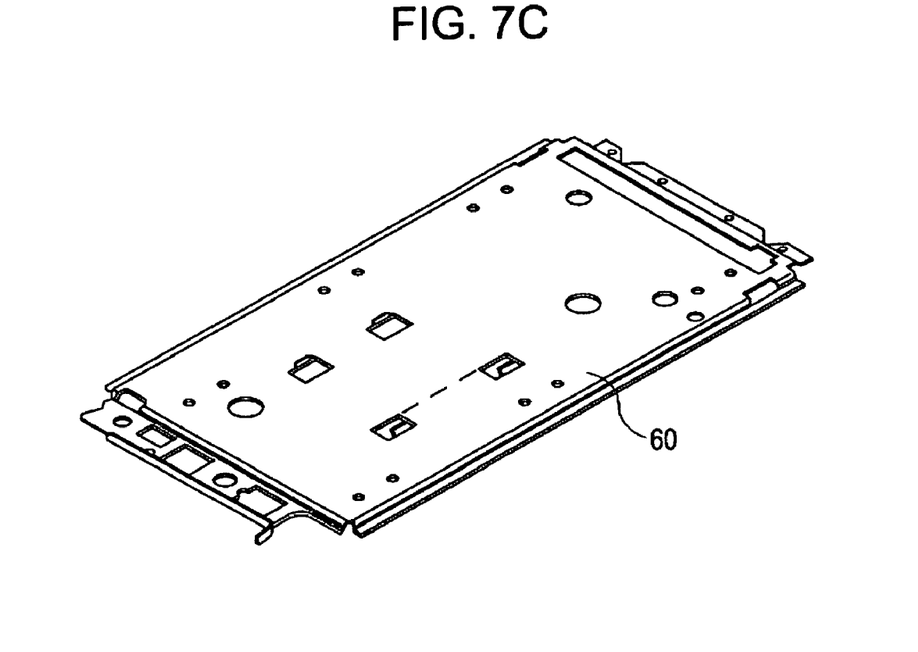
FIG. 7C is an illustration of a view showing the conductive member according to an embodiment of the disclosure.
Figure 7D:
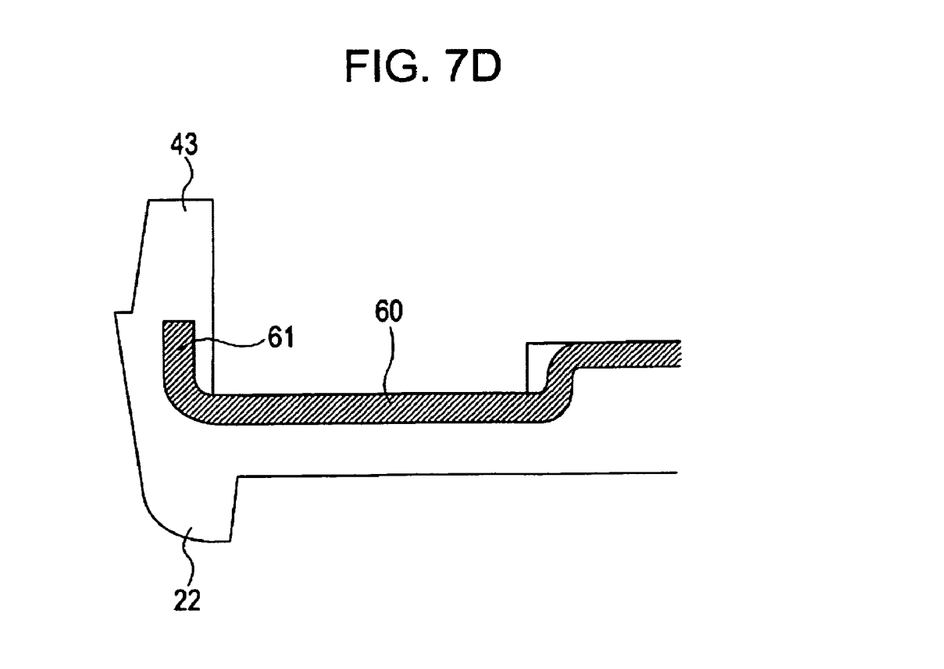
FIG. 7D is an illustration of an enlarged sectional view showing the region surrounding a first protrusion of the front case according to an embodiment of the disclosure.

The function of fitting portion 40 is further elucidated by FIGS. 7A, 7B, 7C, and 7D. FIG. 7A is an illustration of a view showing a front case member 22 with a conductive member 60 attached thereto. FIG. 7B is an illustration of a view showing the front case member 22. FIG. 7C is an illustration of a view showing the conductive member 60. FIG. 7D is an illustration of an enlarged sectional view showing the region surrounding a protrusion 43 of the front case member 22.

As shown in FIG. 7A, the front case member 22 is integrally formed with the conductive member 60 as described above. The front case member 22 shown in FIG. 7B and the conductive member 60 shown in FIG. 7C are integrally formed. To form front case member 22, the conductive member 60 shown in FIG. 7C is placed in a mold for the front case member 22, for example, and resin or the like is injected into the mold so as to make the front case member 22 integral with the conductive member 60.

As shown in FIG. 7D, the conductive member 60 comprises a bent portion 61 in an area corresponding to the protrusion 43 of the front case member 22. That is, the bent portion 61 of the conductive member 60 is located in the protrusion 43 of the front case member 22. The bent portion 61 is bent so as to change from being oriented in the longitudinal direction to being oriented in the depth direction of the first housing 101. The bent portion 61 increases the strength of the protrusion 43, thereby strengthening the fitting portion 40 provided by coupling the protrusion 43 of the front case member 22 into the recess 44 of the rear case member 25. Therefore, when a force in the direction of arrow D (FIG. 6) is applied to the components of the portable electronic device 100, the components are protected from being broken or detached.

As explained above, in one embodiment, the front case member 22 and the conductive member 60 are integrally formed, and the bent portion 61 is formed in the portion corresponding to the protrusion 43 so as to increase the strength of the fitting portion 40. However, the present disclosure is not limited to such a structure. For example, the rear case member 25 may be integrally formed with the conductive member, and the bent portion 61 may be formed in the recess 44, in a portion of the rear case member 25, or in a portion corresponding to the protrusion 43.

Figure 8:
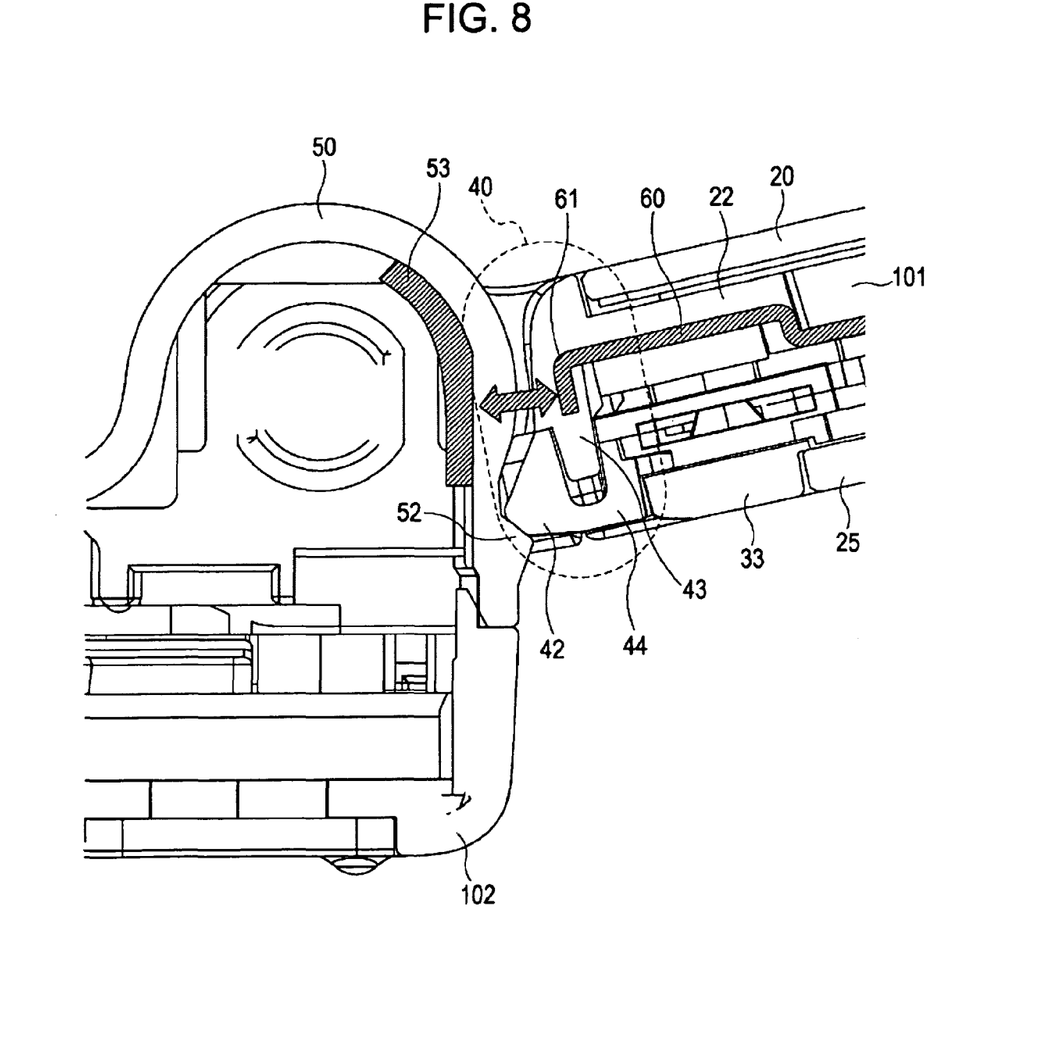
FIG. 8 is an illustration of capacitive coupling between the first housing and the second housing of the portable electronic device according to an embodiment of the disclosure.

FIG. 8 is an illustration of capacitive coupling between the first housing and the second housing of the portable electronic device. The embodiment described in FIG. 8 may include: the LCD plate 20, the LCD module 21, the front case member 22, the second case member 25 (a rear case), the hinge cover 33, the fitting portion 40, the fitting portion stopper 42, the protrusion 43, the recess 44, the protrusion 50, the protrusion stopper 52, a conductive portion 53, the conductive member 60, the bent portion 61, the first housing 101, the second housing 102, and the hinge section 103 (not shown). Components of the portable electronic device 100 shown in FIG. 8 may share same parameters, definition and functionality as FIGS. 1-7. Therefore, these definitions and the functionalities are not redundantly explained herein.

FIG. 8 illustrates another embodiment of the disclosure arising from the movability of the fitting portion 40. The first housing 101 and the second housing 102 may be physically connected by the hinge section 103 in the portable electronic device, but may be electrically disconnected at the hinge section 103. This is because a direct electrical contact between the first housing 101 and the second housing 102 may be unreliable when the housings 101/102 flex under a force A. While not have the direct electrical contact can provide design advantages, the disconnection may deteriorate the performance of the antenna. According to an embodiment, capacitive coupling between the first housing and the second housing may be used to provide the electrical connection between the housings 101/102.

According to an embodiment, the protrusion 50 of the second housing 102 may contain a conductive portion 53. The conductive portion 53 may be, without limitation, a metal. The conductive portion 53 may be formed by metallization or coating with at least one metal.

The portable electronic device 100 is configured such that the conductive member 60 (the bent portion 61) of the first housing 101 is located near the conductive portion 53 of the second housing 102 even though the housings 101/102 rotate relative to each other. The conductive member 60 and the conductive portion 53 are electrically connected to each other with capacitive coupling when they are sufficiently near to each other. In this manner, the conductive member 60 and the conductive portion 53 are electrically connected to each other with capacitive coupling. Since the first housing 101 and the second housing 102 remain electrically connected to each other even though the housings 101/102 rotate relative to each other, performance of the antenna 70 is maintained.

When the portable electronic device 100 is in the fully open position, the conductive member 60 (the bent portion 61) in the first housing 101 physically approaches the conductive portion 53 formed in the protrusion 50 of the second housing 102. The conductive member 60 physically approaches the conductive portion 53 so as to facilitate capacitive coupling with the conductive portion 53. In this manner, the first housing 101 and the second housing 102 are electrically connected to maintain performance of the antenna 70.

In one embodiment, an antenna may be located in each of the first housing 101 and the second housing 102. This embodiment can also benefit from a good antenna performance due to the capacitively coupled configuration of the present disclosure.

In another embodiment, the conductive portion 53 comprises an electronic component with a metal portion located in the second housing 102, and the electronic component may be capacitively coupled with the conductive member 60 in the first housing 101.

Throughout this disclosure, features are referred to as being "coupled" or "connected" together. Unless stated otherwise, "coupled" means that a feature is joined or communicates directly or indirectly to/with another feature. Furthermore, unless stated otherwise, "connected" means that a feature is joined or communicates directly to/with another feature. Being "coupled" or "connected" does not necessarily mean mechanically. Although the exemplary figures may depict arrangements of component features, an embodiment of the disclosure may comprise additional intervening components or features.

While at least one exemplary embodiment has been presented in the foregoing detailed description, the present invention is not limited to the above-described embodiment or embodiments. Variations may be apparent to those skilled in the art. In carrying out the present disclosure, various modifications, combinations, sub-combinations and alterations may occur in regard to the elements of the above-described embodiment insofar as they are within the technical scope of the present disclosure or the equivalents thereof. The exemplary embodiment or exemplary embodiments are examples, and are not intended to limit the scope, applicability, or configuration of the disclosure in any way. Rather, the foregoing detailed description will provide those skilled in the art with a template for implementing the exemplary embodiment or exemplary embodiments. It should be understood that various changes can be made in the function and arrangement of elements without departing from the scope of the disclosure as set forth in the appended claims and the legal equivalents thereof. Furthermore, although embodiments of the present disclosure have been described with reference to the accompanying drawings, it is to be noted that changes and modifications may be apparent to those skilled in the art. Such changes and modifications are to be understood as being included within the scope of the present disclosure as defined by the claims.

What is claimed is:

1. A portable electronic device, comprising: a first housing including a first hinge assembly portion, comprising: a first case member comprising a first protrusion and integrally formed with a conductive member having a bent portion located in the first protrusion, wherein the conductive member increases the strength of the first protrusion; a second case member comprising a second recess into which the first protrusion is fitted; and a fitting portion comprising the first protrusion and the second recess at which the first case member is fitted to the second case member; a second housing including a second hinge assembly portion and a conductive portion that is capacitively coupled to the conductive member; a hinge comprising the first hinge assembly portion and the second hinge assembly portion, the hinge configured to couple the first housing to the second housing such that the first housing and the second housing are rotatable relative to each other between a closed position and a fully open position; and a stopper located in the fitting portion of the first housing, and configured to limit rotation of the first housing and the second housing such that the first housing and the second housing are limited from rotation beyond the fully open position in an open direction.

2. The portable electronic device according to claim 1, wherein the conductive member is electrically connected to a reference potential portion.

3. The portable electronic device according to claim 2, wherein the conductive member has a shape comprising at least one of the group consisting of: sheet, block, tube, mesh, and plane.

4. The portable electronic device according to claim 2, wherein the conductive member provides structural support to the first housing.

5. The portable electronic device according to claim 2, wherein the first housing further comprises electronic components.

6. The portable electronic device according to claim 1, wherein an antenna is positioned in at least one of the group consisting of the first housing and the second housing, the fitting portion further comprises a conductive member.

7. The portable electronic device according to claim 6, wherein the conductive portion is capacitively coupled to the conductive member when the portable electronic device is at least in the fully open position.

8. The portable electronic device according to claim 1, wherein the first housing further comprises a third case member located near the fitting portion, wherein the third case member is fitted to at least one of the group consisting of the first case member and the second case member.

9. The portable electronic device according to claim 8, wherein the third case member is fitted to the fitting portion.

10. The portable electronic device according to claim 1, wherein the bent portion of the conductive member is positioned in the second recess of the fitting portion.

11. The portable electronic device according to claim 1, wherein the fitting portion comprises a gap when the first protrusion and the second recess are fitted together.

12. A portable electronic device comprising: a first housing including a first hinge assembly portion, comprising: a first case member comprising a first recess; a second case member comprising a second protrusion and integrally formed with a conductive member having a bent portion located in the second protrusion, wherein the conductive member increases the strength of the second protrusion, wherein the second protrusion is fitted into the first recess; and a fitting portion comprising the first recess and the second protrusion at which the second case member is fitted to the first case member; a second housing including a second hinge assembly portion and a conductive portion that is capacitively coupled to the conductive member; a hinge comprising the first hinge assembly portion and the second hinge assembly portion, the hinge configured to couple the first housing to the second housing such that the first housing and the second housing are rotatable relative to each other between a closed position and a fully open position; and a stopper located in the fitting portion of the first housing, and configured to limit rotation of the first housing and the second housing such that the first housing and the second housing are limited from rotation beyond the fully open position in an open direction.

13. The portable electronic device according to claim 12, wherein the bent portion of the conductive member is positioned in the first recess of the fitting portion.

14. A portable electronic device, comprising: a first housing including a first hinge assembly portion, comprising: a first case member comprising a first protrusion and integrally formed with a conductive member having a bent portion located in the first protrusion, wherein the conductive member increases the strength of the first protrusion; a second case member comprising a second recess into which the first protrusion is fitted; and a fitting portion comprising the first protrusion and the second recess at which the first case member is fitted to the second case member; a second housing including a second hinge assembly portion and a conductive portion that is capacitively coupled to the conductive member; means for coupling the first housing and the second housing to each other comprising the first hinge assembly portion and the second hinge assembly portion such that the first housing and the second housing are rotatable relative to each other between a closed position and a fully open position; and means for stopping rotation of the first housing and the second housing located in the fitting portion of the first housing such that the first housing and the second housing are stopped from further rotation from the fully open position in an open direction.

15. The portable electronic device according to claim 14, wherein the first housing comprises means for fitting the first case member to the second case member.

16. The portable electronic device according to claim 15, where in the means for stopping the rotation of the first housing and the second housing comprises a stopper, wherein the stopper comprises a part of the means for fitting the first case member to the second case member.

17. A portable electronic device, comprising: a first housing including a first hinge assembly portion, comprising: a first case member comprising a first protrusion and integrally formed with a conductive member having a bent portion located in the first protrusion, wherein the conductive member increases the strength of the first protrusion; a second case member comprising a second recess into which the first protrusion is fitted; and a fitting portion comprising the first protrusion and the second recess at which the first case member is fitted to the second case member; a second housing including a second hinge assembly portion and a conductive portion that is capacitively coupled to the conductive member; a connecting section comprising the first hinge assembly portion and the second hinge assembly portion configured to couple the first housing and the second housing to each other such that the first housing and the second housing are rotatable relative to each other between a closed position and a fully open position; and a stopper comprising a part of the fitting portion, and configured to absorb at least some of an applied force into the fitting portion, and thereby to limit rotation of the first housing and the second housing such that the first housing and the second housing are prevented from further rotation from the fully open position in an open direction.

* * * * *